United States Patent [19]
Nielson

[11] Patent Number: 5,235,815
[45] Date of Patent: Aug. 17, 1993

[54] TREATMENT OF EFFLUENT GASES FOR POLLUTION REMOVAL AND RECOVERY OF VALUBLE PRODUCTS

[76] Inventor: Jay P. Nielson, 3490 Monte Verde Dr., Salt Lake City, Utah 84109

[21] Appl. No.: 810,195

[22] Filed: Dec. 19, 1991

[51] Int. Cl.$^5$ ............................................. F25J 1/00
[52] U.S. Cl. ........................................ 62/10; 62/12
[58] Field of Search ............................. 62/12, 10, 35

[56] References Cited

U.S. PATENT DOCUMENTS

| | | | |
|---|---|---|---|
| 3,160,490 | 12/1964 | Fabre et al. ................ | 62/5 |
| 3,224,208 | 12/1965 | Schumberger et al. ....... | 62/12 |
| 3,236,057 | 2/1966 | Hashemi-Tafreshi ......... | 62/12 |
| 3,324,668 | 6/1967 | Lohrenz et al. ............. | 62/10 |

FOREIGN PATENT DOCUMENTS 126505 6/1959 U.S.S.R. .

*Primary Examiner*—Ronald C. Capossela
*Attorney, Agent, or Firm*—Mallinckrodt & Mallinckrodt

[57] ABSTRACT

A method and apparatus for removing atmospheric pollutants and for producing carbon dioxide and hydrochloric acid from effluent gas streams. The effluent gas is first subjected to cryogenic refrigeration to remove many of the atmospheric pollutants as liquids and the residual gas stream is subjected to centrifugation while the carbon dioxide is frozen to occlude particulate solids and while the gaseous hydrochloric acid and nitrogen gas, oxygen gas, and miscellaneous gases are liquified and separated from the frozen carbon dioxide by centrifugal force, removal of the frozen carbon dioxide to discharge, against the resistance caused by the centrifugal force.

29 Claims, 5 Drawing Sheets

TREATMENT OF EFFLUENT GASES FOR POLLUTION REMOVAL AND RECOVERY OF VALUBLE PRODUCTS

BACKGROUND OF THE INVENTION

Field

The invention is in the field of methods and apparatus for the cleaning of effluent gases to remove pollutants and particulate matter and is concerned also with the production of carbon dioxide and hydrochloric acid from such gases.

State of the Art

In most instances, effluent gases are cleaned by means of scrubbers and/or electrostatic precipitators, but such cleaning is by no means complete. In many instances, effluent gases are cleaned very little or not at all due to the very high cost of doing so. Many power plants burn lignite (very high in sulfur), which is one of the worst types of fuel for polluting the air. Others burn garbage, which is even more polluting.

Carbon dioxide is regarded by many as a pollutant. Others are highly concerned by the earth warming and ozone depleting consequences of increasing amounts of carbon dioxide released to the atmosphere. Many ineffective, impractical, and very expensive programs are being proposed to reduce the release of carbon dioxide into the air.

Nielson U.S. Pat. No. 4,829,911 teaches how air polluting effluent gases are cryogenically reduced in temperature until many of the air polluting gasses liquify. The liquids are then trapped, removed and utilized effectively in industry. That patent also teaches a method for removing carbon dioxide and particulate matter by utilizing a large gravity settlement basin for removal of carbon dioxide snow and occluded particulate matter.

In 1990, the U.S. Clean Air Act was amended by mandating that one hundred eighty nine specified polluting chemicals be removed from industrial stacks. Existing technology can remove only from six to eight of these chemicals and then only in quantities of from 40% to 95% of each at great expense. The fact of the matter is that there is no existing technology by which industry can comply with the law. From a practical standpoint, industry can only be required to use the best technology available. In short, the state-of-the-art is in a sorry state.

SUMMARY OF THE INVENTION

The principal objective in the making of the present invention was to remove each of the targeted one hundred and eighty nine polluting chemicals substantially completely, along with other pollutants not targeted in the law, totaling over 300, all at relatively low cost.

In contrast to my aforementioned U.S. Pat. No. 4,829,911, the present invention teaches a method of removing frozen carbon dioxide, ice or snow, and occluded particulate matter, as well as hydrochloric acid and other gaseous pollutants as liquids, in a faster, more efficient, much more effective, less expensive, and less space-consuming manner. The present invention is related in various respects to my U.S. patent applications Ser. No. 07/542,816 of Jul. 25, 1990 and Ser. No. 07/724,910 of Jul. 2, 1991, but is significantly different in various respects.

Effluent gas from any source is first cryogenically refrigerated to remove the majority of the gaseous pollutants as liquids. These liquified gases are trapped and removed as liquids. The residual gas containing predominantly carbon dioxide ($CO_2$), oxygen ($O_2$), hydrochloric acid (HCl), and particulate matter is passed to a centrifuging operation, preferably accompanied by electrostatic precipitation and vibration. The temperature of the residual gas stream at this stage will normally be between $-90$ deg. F. and $-110$ deg. F. at a pressure between two and three atmospheres, although these values may vary considerably. This gas stream is again reduced in temperature, normally by means of a sudden pressure drop, such that the carbon dioxide freezes to ice or snow and occludes particulate matter therein. The hydrochloric acid gas concurrently condenses to liquid at approximately $-118$ deg. F. and is removed.

The gases remaining in the gaseous state in the residual stream are predominantly oxygen ($O_2$) and nitrogen ($N_2$), with minor amounts of inert and other gases. These exit the centrifuge at approximately $-120$ deg. F. to $-150$ deg. F. and 5 psi to 15 psi but may have higher or lower values. They are normally passed to a liquid-air compressor, where either or both the predominant gases are liquified. They may then be used as cooling agents, during which time they become heated to ambient temperature or perhaps much higher. This is in accordance with my U.S. Pat. No. 4,728,341. The oxygen may be charged into a garbage or coal burning furnace as taught by my U.S. Pat. No. 4,829,911. The clean nitrogen gas may all, or in part, find a market. If not, it may be released into the atmosphere as a very clean non-polluting gas. The inert and other gases can be separated by conventional means and generally will find a ready market in industry.

The frozen carbon dioxide with occluded particulate matter is passed from the centrifuge preferably into a heated rotating kiln where just enough heat is added to convert it into a gas, which may be drawn off and transported to market, or used as a coolant or both. The particulate matter exits the kiln and may be cast into solid form to prevent blowing into the atmosphere.

In the centrifuge, a screw conveyor operating continuously at a rotational velocity differential with the centrifuge carries the frozen carbon dioxide axially to the bottom of the centrifuge through a revolving air-lock valve. From where it is conveyed on a conveyor belt or equal to the gas-solid seperating kiln.

THE DRAWINGS

The best mode presently contemplated for carrying out the invention is illustrated in the accompanying drawings, in which:

FIG. 1 is a schematic presentation of the invention in terms of a flow sheet along with the showing of various component items of equipment;

FIG. 2, a vertical section, partly in elevation, through apparatus shown and indicated generally by the flow sheet of FIG. 1 but drawn to a larger scale;

FIG. 3, a fragmentary vertical section taken along the line 3—3 of FIG. 2 and drawn to a larger scale;

FIG. 4, a fragmentary horizontal section taken along the line 4—4 of FIG. 2 turned counterclockwise by ninety degrees and drawn to a larger scale;

FIG. 5, a fragmentary horizontal section taken along the line 5—5 of FIG. 2, orientated as in FIG. 4 and again drawn to a larger scale;

FIG. 6, a horizontal section taken along the line 6—6 of FIG. 2; and

FIG. 7, a fragmentary vertical section taken along the line 7—7 of FIG. 2 and drawn to a larger scale.

DETAILED DESCRIPTION OF THE ILLUSTRATED EMBODIMENT

Since the apparatus employed in the present process is similar in large part to that shown in my U.S. patent applications Ser. No. 07/542,816 and Ser. No. 07/724,910 and my U.S. Pat. No. 4,728,341 and No. 4,829,911, the same reference numbers are employed for corresponding items and pertinant descriptions and explanations are incorporated by reference.

Figure 1:
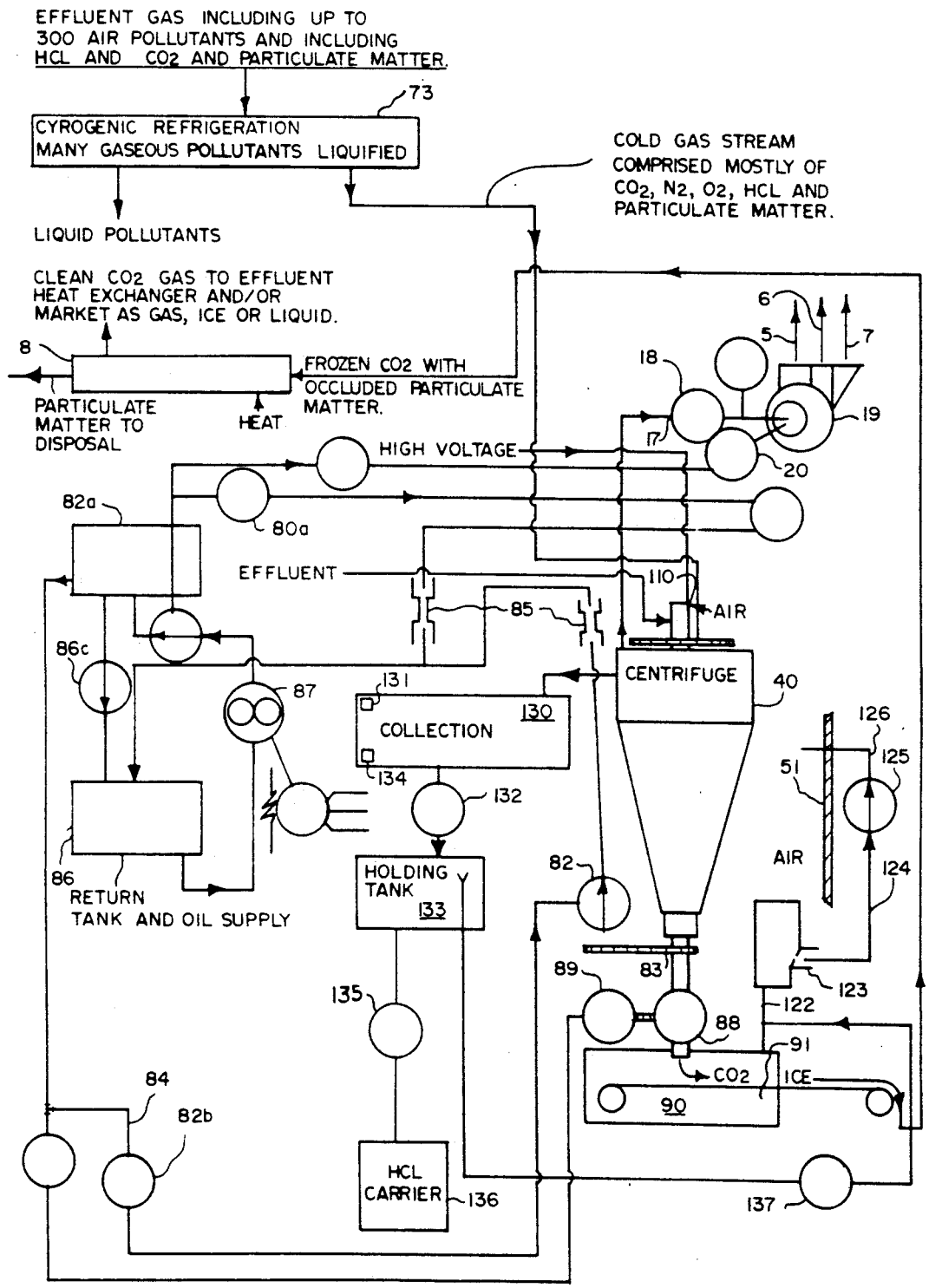

As indicated in FIG. 1, an effluent gas stream containing atmospheric pollutants that include gaseous carbon dioxide (CO2) and hydrochloric acid (HCl), along with relatively small quantities of inert and other gases as well as particulate matter, is subjected to cryogenic refrigeration in any conventional refrigeration equipment 73 capable of operating at cryogenic temperatures, to liquify many of the pollutant gases carried by the stream of exhaust gas. These are drawn off as liquids to be sent to market. The residual gas stream containing predominantly the carbon dioxide (CO2), nitrogen (N2), oxygen, (O2), and hydrochloric acid (HCL), along with particulate matter, is passed into centrifuge 40 through hollow shaft 70 thereof from one of the ports of a two port rotating union 110, FIG. 2. Typically, this is the gas stream flowing through the pipe 120 of the apparatus shown in my U.S. Pat. No. 4,829,911. The residual gas stream passes from hollow shaft 70 and sleeve 4 through many small holes therein 109, FIG. 3, into the centrifuging compartment of centrifuge 40 in which the pressure is sufficiently low to cause the gases to expand, resulting in a lowering of the temperature of such gases to cause the carbon dioxide to freeze (at approximately −110 deg. F.) The hydrochloric acid condenses to liquid at approximately −118 deg. F. Centrifuge 40 is rotated at a selected speed to provide optimum carbon dioxide production. This speed depends on the particular make up, volume, temperature, and pressure of the effluent gas and will be within the range of 100 RPM to 4,000 RPM, providing a centrifugal force ranging from 3.4 to 5,456 multiples of gravity. This could be more or less than these values.

Centrifugal force causes the solid particles, with the possible exception of the very small sizes such as "PM10" (10 micrometers) and smaller, and the frozen carbon dioxide snow to be moved to the outside of the centrifuging chamber formed between center shaft 70 and 4 and the inner surface of a cylindrical wall 45 of the centrifuge. Such movement of said solids and especially the very small sizes can be greatly enhanced by generating an electrostatic field in the space between the sleeve portion 4 of shaft 70 and the inside diameter of a centrally open, upper flight section 74 of screw conveyor 72. Such electrostatic field can be generated by introducing a high voltage charge to conductive sleeve 4, screw 72 serving as a ground. For this purpose, an adjustable and variable 10,000 to 100,000 volt direct current is sent through conductor 1 to a revolving slip ring 2, FIG. 2, which energizes a conductor 3, FIG. 3, that extends down through hollow shaft 70 and attaches to electric conductive sleeve 4 surrounding and having holes matching those 109 of shaft 70. The inside surfaces of the flights of conveyor screw section 74 will remain free of adhering ice due to vibration and centrifugal force and, thus, will serve as the outside diameter (Dd), while sleeve 4 serves as the inside diameter (Dt), of a concentric-cylinder type electrical precipitator. The screw 72 contacts cylinder wall 45 of the centrifuge as it turns. Wall 45 is attached to deflector 60, which, through attachment to flexible and electrically conductive flap 66b that is in turn connected to electrical conductor 8, effectively grounds the conveyor screw 72. The electrostatic field strength is given by the equation $Ef = E/r \ln(Dt/Dd)$. This is equation (20-88), Page 20-104, Chemical Engineers' Handbook, fifth edition, by Perry and Chilton. For this:

$Ef$ = Electrostatic Potential Gradient (statvolts/cm).

$E$ = Electrostatic Potential difference (statvolts).

$r$ = Radius: distance from center line of concentric cylinder electrical precipitator (cm) or (ft). Dd and Dt are measured in (cm) or (ft).

The ideal Electrostatic Potential Gradient is that which occurs just prior to a significant amount of sparking. The sparking potential is given by the equation (20-90) of above reference, i.e. by $Es = Eo\, Kp\, Be + Ko\, Eo$.

$Es$ = Electrostatic Potential difference required for sparking to commence (statvolts)

$Eo$ = Electrical breakdown constant for gas (statvolts/cm)

$Kp$ = Gas density relative to its density at 0 deg. C. (dimensionless).

$Be$ = Spacing between rod and curtain in electrostatic precipitator (cm. or ft.)

$Ko$ = "Energy distance" constant for electrical discharge in gases (cm.). For air in the range of $KpBe$ from 0.1 to 2, $Eo = 111.2$ and $Ko = 0.048$.

The processed gas herein considered is similar to air but is not exactly air, therefore the above values may vary and will need to be measured or found by experimentation for the particular gas mixture being processed. Corona will set in only if (Dt/Dd) is greater than 2.718.

Figure 3:
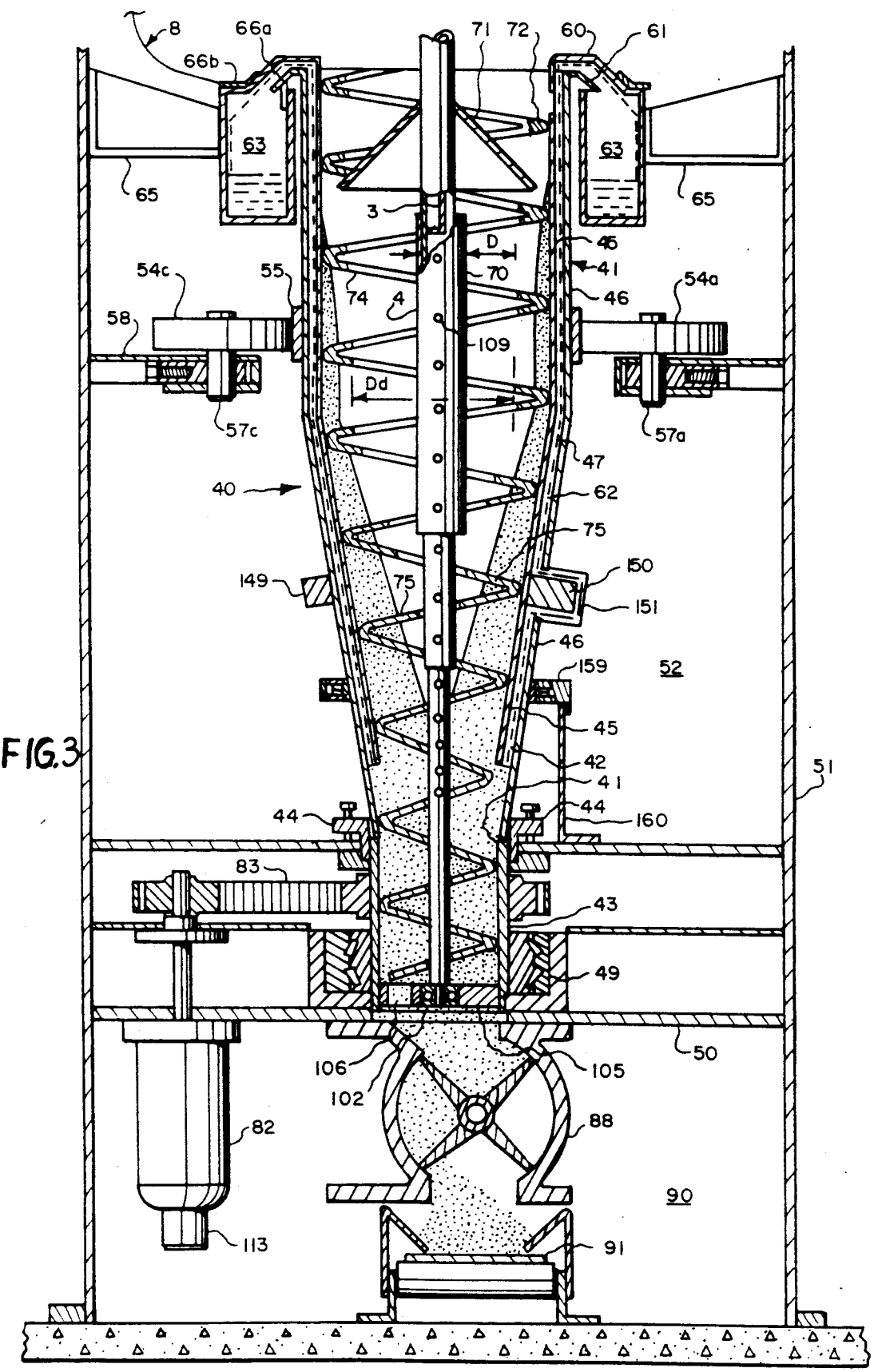

The frozen carbon dioxide with occluded particulate is forced downwardly by conveyor screw 72, FIG. 3, and by its screw section conveyor 75, with its closed flight configuration, and is discharged through air-lock valve 88 onto conveyor belt 91.

Figure 2:
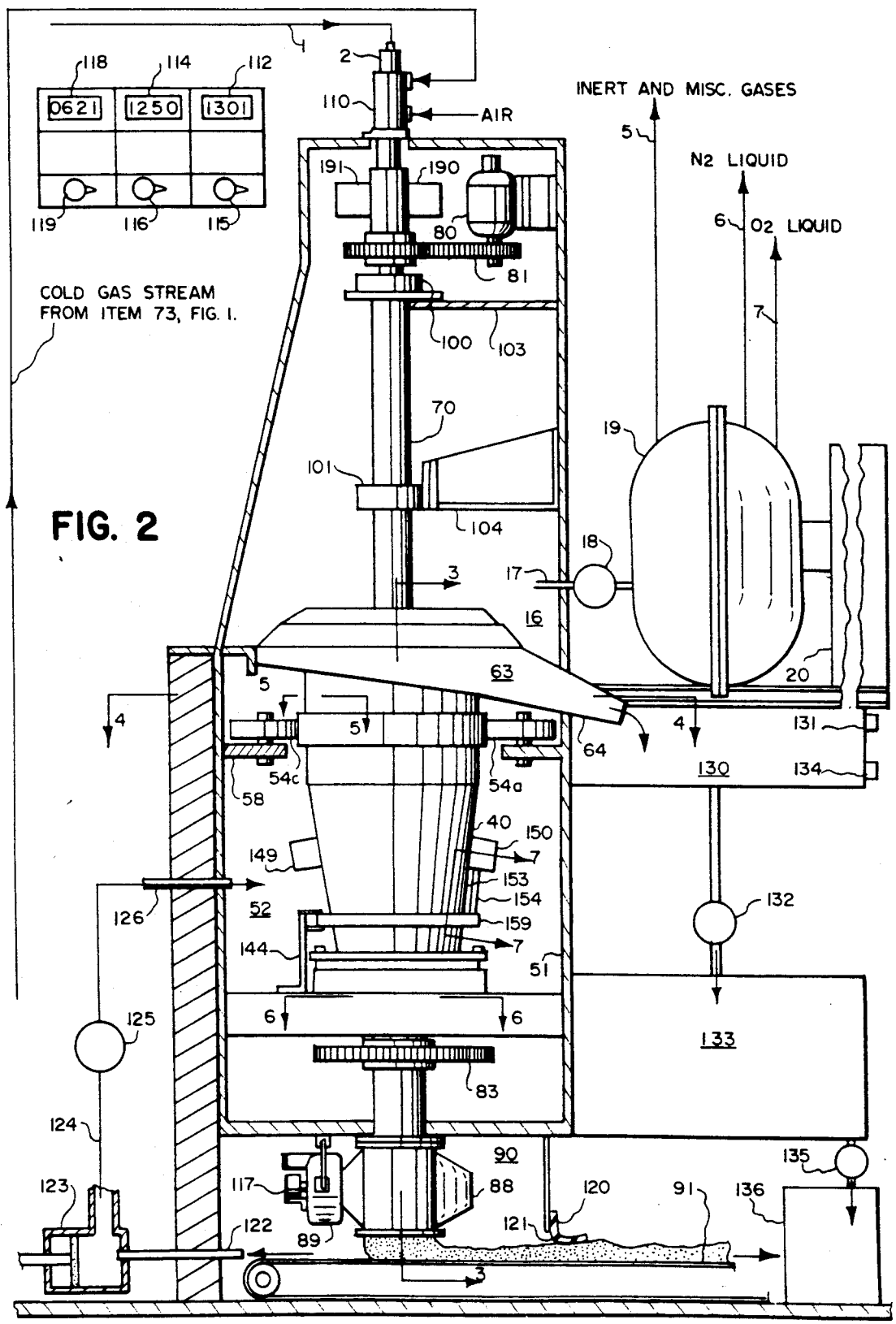

The oxygen, nitrogen, and miscellaneous gases entering compartment 52, FIGS. 2 and 3, from the centrifuge are first pressurized by a gas compressor 19, FIG. 1, which is driven by motor 20 and receives the gas through conduit 17 under the control of valve 18. The fraction of the gas exiting compressor 19, through conduit 5, is a mixture of inert gases and very small quantities of other gases, such as hydrogen (H2), carbon monoxide (CO), methane (CH4), and others having very low dew points. These gases are separated by conventional methods and generally have a ready market. The liquid oxygen exiting through conduit 6 may be first utilized as a coolant for the exhaust gas and then inserted into the furnace providing the combustion gas with excess oxygen for combustion. The liquid nitrogen exiting through conduit 7 is marketed as liquid nitrogen and/or used as a coolant for the effluent gas and then marketed and/or released into the atmosphere as a very clean and non-polluting gas. The liquid or gaseous oxygen and/ or liquid or gaseous nitrogen separately may be combined with makeup liquid or gaseous oxygen and nitrogen separately taken from the air.

Centrifuge 40 comprises a cylindrical section 41, FIG. 3, a truncated cone section 42, and a cylindrical end-bearing section 43. Cylindrical section 41 and truncated cone section 42 have wall 45 as a common inner wall. They also have in common, outer wall 46. Separating the two walls is a corrugated cylindrical wall member 47, FIGS. 4 and 5. Inner wall 45 is fashioned from highly hardened "Hastelloy" or equal. Outer wall 46 and cylindrical wall 43 are fashioned from corrosion resistant material. Inner wall 45 has a series of apertures 48, FIG. 5, extending over substantially its entire area. Apertures 48 are spaced apart and have opening size as required for optimum gas cleaning volume or carbon dioxide production. Typically, they are spaced approximately one inch in both directions and are tapered such that the diameter at the inner surface is approximately 1/16 inch and at the outer surface is approximately 3/32 inch. The taper serves to inhibit trapping of solids, such as sand and carbon dioxide ice particles, in the apertures.

End-bearing section 43, FIG. 3, is an extension of outer wall 46 and is configured as shown. It is supported by a combination two-direction thrust and radial bearing 49, which, in turn, is supported by platform 50 attached to the inside surface of an enclosing outer cylindrical wall 51. Such cylinder is fashioned from steel plate or tubing or equal. Gas seals 44 are provided to prevent leakage of gas from chamber 52.

Figure 4:
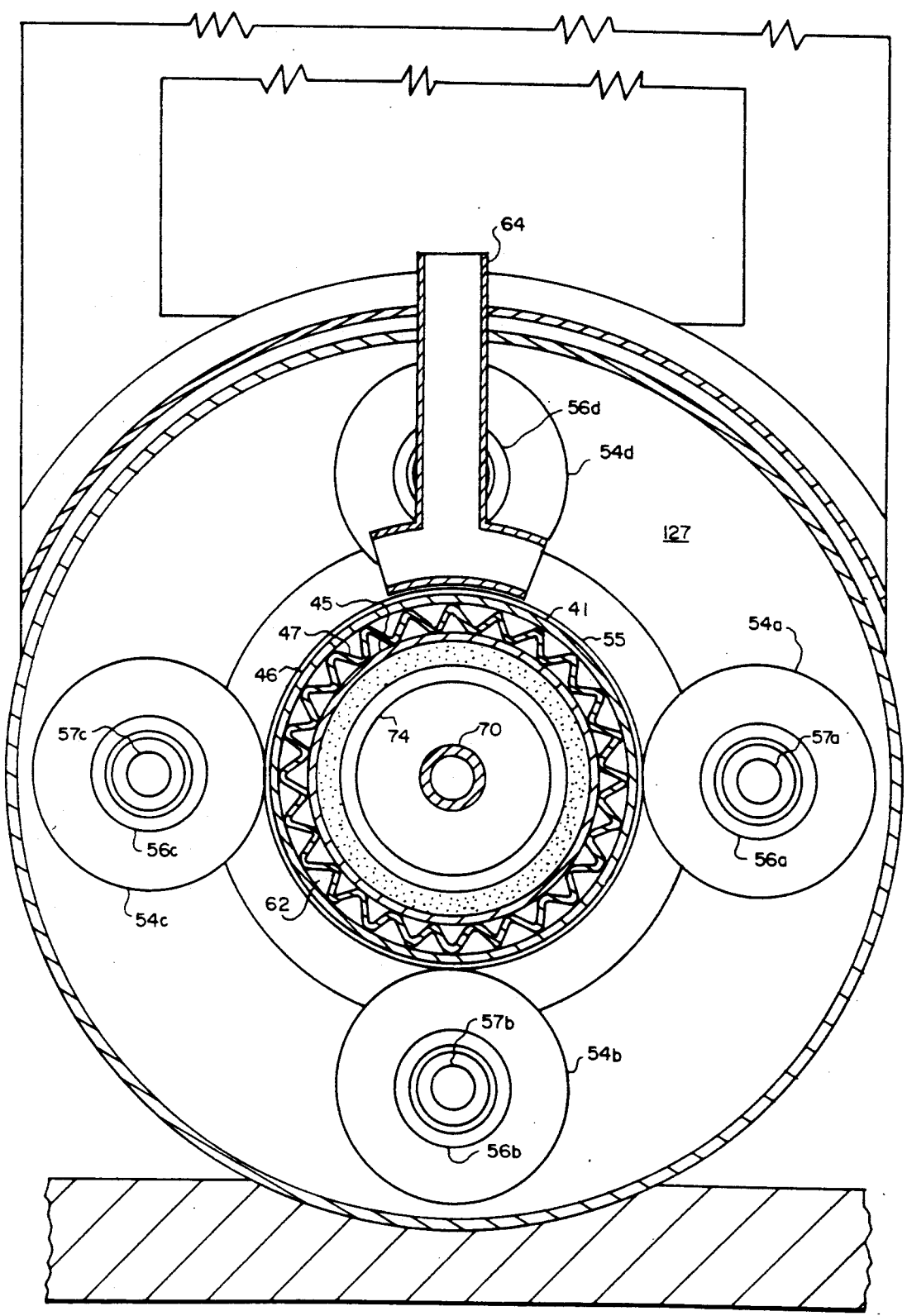
Figure 5:
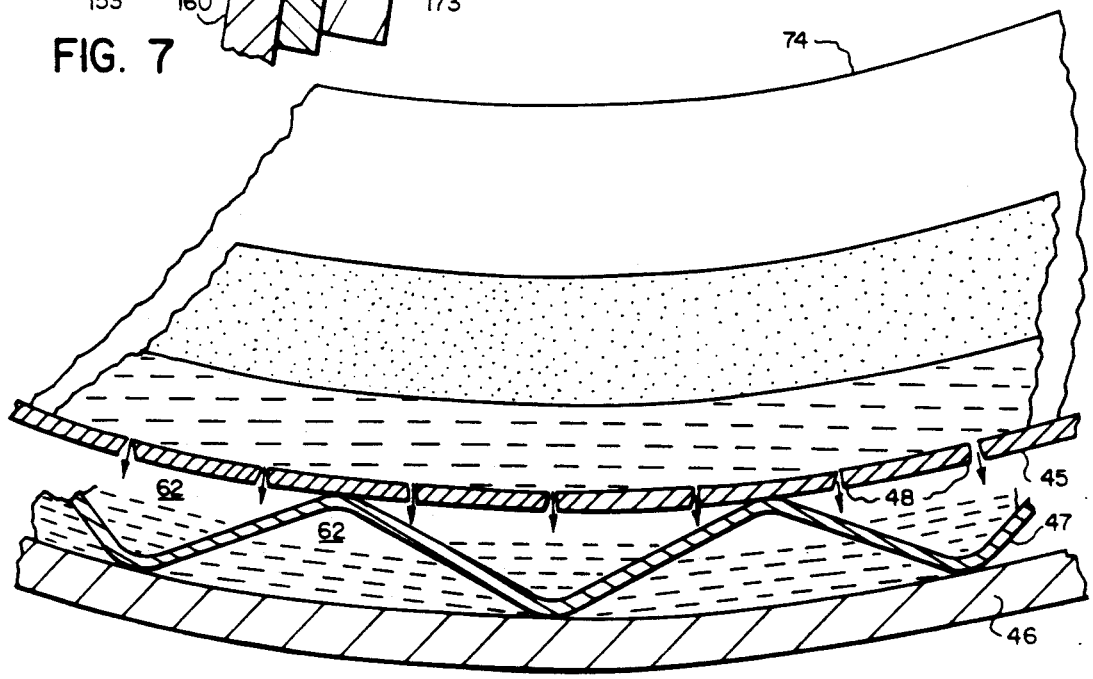

The cylindrical section 41 of centrifuge 40 is stabilized by four rollers 54a-54d, FIGS. 3 and 4, which bear against an annular ring 55 attached to outer wall 46 of section 41, and which have respective internal bearings 56a-56d, FIG. 4, journaled to shafts 57a-57d. These, in turn, are adjustably supported on annular ring 58 that is attached to cylindrical wall 51.

The upper end of inner wall 45 has an annular, downwardly facing, deflector member 60 attached to it as shown in FIG. 3. The upper end of outer wall 46 has a corresponding annular deflector member 61 attached to it and spaced apart from member 60 as shown. Thus, hydrochloric acid liquid, which is driven through apertures 48, FIG. 5, by centrifugal force, rises in passageways 62 formed by corrugated member 47 between inner wall 45 and outer wall 46 and is deflected downwardly and into annular launder 63, FIG. 2, from whence it flows to discharge spout 64.

Launder 63 is supported by cylinder 51 through brackets 65, FIG. 3. Since launder 63 is stationary and annular member 60 and 61 are rotating, there must necessarily be a space between them or a sliding contact. This is covered by the splash flaps 66a and 66b serving to prevent cold hydrochloric acid liquid from splashing out of launder 63. When the electrostatic precipitation option is exercised, flap 66b is made of flexible, electric conducting material, such as a thin layer of "Hastelloy" metal as previously mentioned, with electrical conductor 8 attached. This serves as a ground for conveyor screw 72.

Centrifuge 40, along with its bearings, supports, drive motor, and other items, is enclosed in outer cylindrical wall 51 as shown in FIGS. 2 and 3. Normally, centrally positioned within cylindrical wall 51, and extending axially through centrifuge 40, is the rotating, non-electrically conducting, tubular shaft 70, which rotates at a speed preferably approximately 10 to 100 RPM faster or slower than the centrifuge. Attached to shaft 70, and positioned at a location close to but somewhat lower than the upper end of centrifuge 40, is a truncated, cone-shaped diverter 71, FIG. 3. As the oxygen, nitrogen, and other gases rise in centrifuge 40, diverter 71 forces them into close proximity with conveyor screw 72 and cylindrical inner wall 45 where almost full centrifuge rotational velocity is imparted to the gas stream by friction between the gas and surfaces of rotating components. Solid particles, including frozen carbon dioxide, are forced outwardly toward cylindrical wall 45 and are then forced downwardly by the open and closed flights of the upper and lower sections of screw conveyor 72, which are driven by shaft 70. Preferably, cylindrical wall 45 and conveyor screws are fabricated of "Hastelloy" metal or equal for wear resistance, corrosion resistance, and electrical conductivity. The flights of the conveyor screws have a width equal to the thickness of the layer of frozen carbon dioxide determined to be optimum for the rate of production and particular carbon dioxide content of the exhaust gas being treated. The speed of the centrifuge is largely determined by the gas flow rate, the rotational velocity differential between screw and centrifuge, and the pitch of the screw flights, which is normally in the order of eight inches. The second flight section 75 of conveyor screw 72 commences just below flight section 74, and may be an extension of same. It has flights of width equal to or somewhat greater than the flights of section 74, also with an eight inch pitch or as required, and extending down to the lower end of truncated cone section 42 and into discharging section 43. Lower flights of section 75 have an increasing width until they are full width at their lower portion and are tapered so as to match the cone contour of section 42 and the cylindrical contour of section 43. The pitch of these screw flights is typically eight inches, although it may be more or less or even variable, to generate maximum discharge driving force.

In operation, shaft 70 is preferentially driven by a reversible, variable speed, hydraulic motor 80 through chain drive 81, FIG. 2. Motor 80 is a fixed displacement, reversible, hydraulic motor with a pressure and temperature compensated, flow control valve 80a, FIG. 1, remotely positioned. Hence shaft 70 is driven at an adjustable set rotational velocity irrespective of the highly variable torque demand within the torque limitations of the motor and drive. Additional speed control may be employed by the use of a variable resistance 85 on the exhaust of motor 80. Thus, as shaft 70 rotates with respect to centrifuge 40, the solids are centrifugally forced against inner cylindrical wall 45 and are also driven axially downwardly by the action of feed screw 72. The high frictional force of the solid material against the wall surfaces of centrifuge 40 tends to rotate said centrifuge, which, if left unrestrained, will approach the speed of shaft 70. However, for correct functioning, the speed of the centrifuge must be precisely maintained at a controlled speed somewhat different than the speed of the screw conveyor, preferably about 10 RPM to 200 RPM less. This is accomplished by driving centrifuge 40 by hydraulic motor 82, FIG. 3, which drives end bearing section 43 through chain drive 83. The rotational velocity of motor 82 is controlled by hydraulic fluid received from adjustable pressurized supply tank 82a through conduit 84, FIG. 1, and then through pressure and temperature compensated, flow control valve 82b, motor 82, and variable resistance 85 into tank 86. The remainder of the hydraulic system is of conventional configuration, as depicted in FIG. 1, and is not described further herein. Pressure in tank 82a is maintained at an adjustable constant pressure by regulated relief valve 86c with hydraulic pump 87, driven by motor 87a, capable of delivering a volume in excess of demand and normally adjusted to deliver a volume just slightly greater than demand in order to conserve energy.

When the solids, primarily frozen carbon dioxide with occluded particles, reach the bottom of the centrifuge, they are forced into rotary airlock feeder 88, which is driven by a variable-speed, shaft-mounted, hydraulic torque arm 89, FIGS. 1 and 2, with fixed hydraulic displacement, and thence into discharge enclosure 90 and deposited on belt 91, which carry them away for further processing. By the time the solids have reached the bottom of centrifuge 40, substantially all of the hydrochloric acid liquid and/or other liquids will have been driven out by centrifugal force through apertures 48 in cylindrical wall 45 and into passageways 62 between walls 45 and 46 and thence upwards and into launder 63.

The frozen carbon dioxide is separated from its occluded particulate matter by inserting the mixture into a heated rotating kiln 8 where sufficient heat is added to volatilize the carbon dioxide, which is drawn off as clean, cold carbon dioxide gas at the lower end of the kiln. This may be marketed as gas, fluid or solid, and may first be utilized as a cooling agent in the effluent heat exchange system. The particulate matter which does not volatize, discharges out the lower end of the kiln to disposal. It may be cast into solid blocks of concrete or slag to prevent the fine dust from blowing into the atmosphere. Additionally, an adhering or coagulating material may be inserted into the kiln to insure that the very fine particulate matter is prevented from becoming mixed into the exiting carbon dioxide gas.

Figure 6:
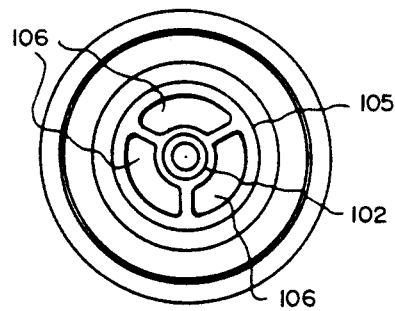

Shaft 70 is positioned and supported by bearings 100 and 101, FIG. 2, and 102, FIG. 3. Bearings 100 and 101 are supported by platform 103 and 104 attached to cylindrical wall 51. Bearing 102 is supported by spider 105, FIGS. 3 and 6, which is attached to end-bearing section 43. Spider 105, FIG. 6, has openings 106 through which the solids may pass.

As previously mentioned, shaft 70 and sleeve 4 have a number of transverse small holes 109 provided along their length, FIG. 3, thus serving as a sparger. Pressurized and cold effluent gas is introduced into the upper end of shaft 70 through one of the two ports of rotating union 110, FIGS. 1 and 2, and then exits through holes 109 into a chamber having less pressure, thereby causing the gas to expand sufficiently to lower the temperature in accordance with Boyle's Law sufficiently that the carbon dioxide will freeze at approximately $-110$ deg. F. and the hydrochloric acid will liquify at approximately $-118$ deg. F.

A tachometer 111, FIG. 2, is mounted on the shaft of motor 80 and provides a speed readout of screw conveyor 72 on indicator 112. A second tachometer 113 is mounted on the shaft of pump 82, FIG. 3, which provides a speed readout of the centrifuge on indicator 114. Control knobs 115 and 116 are used to control the speed of the motor and the pump by conventional means, not shown here. Optionally, conventional automatic means, not shown, may also be incorporated to maintain the desired speeds, and also the differential speed between the screw conveyor and the centrifuge, if desired. Additionally, a tachometer 117, FIG. 2, is mounted on the extended shaft of valve 88 and provides a readout on indicator 118. Control knob 119 is used to control the speed of torque arm 89 and of the attached revolving, discharge, air-lock valve, all by conventional means.

Some gas will enter discharge enclosure 90, FIG. 2, along with the solids. A seal 120 at ice exit opening 121 serves to prevent the majority of this gas from exiting along with the solids. A recovery conduit 122 will convey most of the gas out of discharge enclosure 90 and into gas pump 123, wherein it will be pressurized and pumped through conduit 124, check valve 125, and conduit 126 back into compartment 52, which is the space inside cylindrical wall 51.

The hydrochloric acid liquid discharging from spout 64 falls into collection tank 130, FIG. 2. When the acid reaches the level of high limit switch 131, valve 132 is opened and the acid is discharged into holding tank 133. Discharge continues until the acid level reaches low limit switch 134, at which point valve 132 is closed. Holding tank 133 is maintained at atmospheric pressure. When ready to ship from such holding tank, valve 135 is opened and the acid is discharged into a carrier 136, which may be a railroad car, truck, or pipeline. All acid contacting parts need to be fabricated of corrosion resistant materials, such as "Hastelloy" or a plastic.

Means for imparting a high frequency vibration to the solid material and its contacting walls of the centrifuge may be incorporated. It is known that the rate of flow of a viscous fluid through a porous solid is significantly enhanced by high frequency vibration. This is tantamount to decreasing the viscosity of the fluid. In addition, the vibration of the contacting surfaces of the frozen carbon dioxide greatly increases its fluidity. Furthermore, the adhesion of the frozen carbon dioxide to contacting parts of the equipment is greatly reduced by the vibration.

Figure 7:
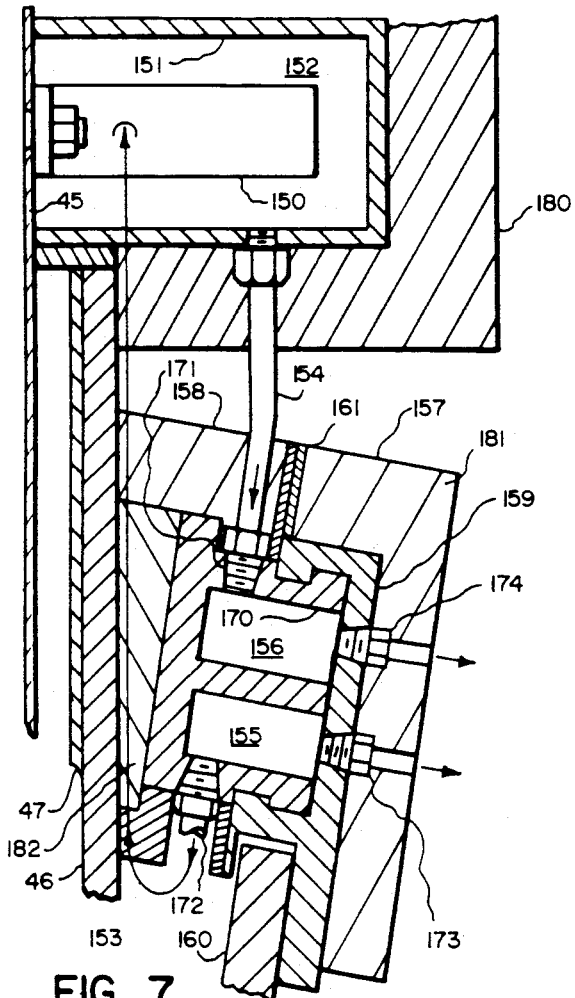

Vibration is preferably effected in the apparatus of the invention by attaching at least one vibrator to a wall or walls of the centrifuge and at least one vibrator to the rotating shaft and its attached conveyor screw. One or more suitable vibrators 150, FIGS. 3 and 7, are attached to inner wall 45 and projecting through matching cutouts in outer wall 46 and corrugation 47. These vibrators may be any standard type such as Model UCV-19, manufactured by Martin Engineering Co., U.S. Route 34, Meponset, Ill. 61345, which incorporates a ball circulating rapidly in a circular ball-race, driven by compressed air. This vibrator unit, when driven by forty psi air, delivers 14,000 vibrations per minute. Inasmuch as vibrators of this type are well known in the art, they are not described further herein. Corresponding counterbalancing counterweights 149 FIG. 3, are attached to outer wall 46 of the centrifuge. Vibrator 150 is shown within a housing 151, FIGS. 1 and 7, which is also attached to inner wall 45 of the centrifuge providing enclosure 152. Compressed air is supplied to vibrator 150 through conduit 153 and exits from enclosure 152 through conduit 154. Conduits 153 and 154 communicate, respectively, with air storage chambers 155 and 156, which are fashioned internally to provide a slip feed ring assembly 157. Slip feed ring assembly 157 is an annular assembly which encircles centrifuge 40, and which comprises a rotating portion 158 attached to outer wall 46 of centrifuge 40, and a stationary portion 159 which is supported by bracket 160. For clarity, the line of demarcation 161 between the stationary portion and the rotating portion is shown emboldened in FIG. 7. The rotating portion 158 comprises an annular member 170 which is fashioned so as to form the upper, lower, and inner walls of chambers 155 and 156, and which has ports 171 and 172 for receiving conduits 154 and 153, respectively. The stationary portion 159 is fashioned so as to form the outer wall of chambers 155 and 156, which has ports 173 and 174 for supply and exhaust means, respectfully, for the compressed air. This mechanism will be operating at very low temperatures and therefore insulation material 180, 181 and 182 may be used for the respective walls.

The bearing surfaces between rotating partition 158 and stationary portion 159 should be lubricated with any very low temperature lubricant. A separate but similar vibrator 190 may be attached to shaft 70, FIG. 2, and counterbalanced with counterweight 191. Compressed air is supplied to vibrator 190 through one of two ports of rotating union 110 from an external source of same (not shown).

As noted above, the use of one or more vibrators will significantly enhance the rate of flow of the hydrochloric acid or other liquids through the holes 48 in wall 45 of the centrifuge. It will prevent adherence of the frozen carbon dioxide to contacting parts, and, finally, it will greatly enhance the fluidity of the solids as they are moved by screw sections 74 and 75.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A method of treating an effluent gas stream containing atmospheric pollutants including gaseous carbon dioxide and hydrochloric acid along with particulate solids, comprising subjecting said effluent gas stream to cryogenic refrigeration to remove various of said pollutants but leaving said carbon dioxide and hydrochloric acid and nitrogen, oxygen, and said particulate solids in the residual gas stream; subjecting said residual gas stream to centrifugation while freezing said carbon dioxide and occluding said particulate solids therein and while liquefying said hydrochloric acid; withdrawing the hydrochloric acid as a liquid product; withdrawing the frozen carbon dioxide as a solid product; and volatilizing the withdrawn carbon dioxide to free it from the said particulate solids.

2. A method according to claim 1, wherein the steps are performed continuously.

3. A method according to claim 1, wherein the material in the centrifuge is subjected to an electrostatic field to facilitate migration of the frozen carbon dioxide and particulate matter outwardly under centrifugation.

4. A method according to claim 1, wherein the centrifuge is vibrated during centrifugation.

5. A method according to claim 1, wherein during centrifugation solid material is moved axially to discharge against the resistance caused by the centrifugal force acting thereon.

6. A method according to claim 1, wherein residual gases emerging from centrifugation are liquified and/or separated by compression.

7. Apparatus for treating an effluent gas stream containing atmospheric pollutants including gaseous carbon dioxide and hydrochloric acid along with particulate solids, comprising cryogenic refrigeration means; means for passing said effluent gas stream into said cryogenic refrigeration means; centrifugation means including means for liquefying the gaseous hydrochloric acid and for freezing the gaseous carbon dioxide in said stream while occluding particulate solids therein and including means for separating the liquified hydrochloric acid and the frozen carbon dioxide during centrifugation; means for passing the residual effluent gas stream from said cryogenic refrigeration means to said centrifugation means; means for separately withdrawing said liquid hydrochloric acid and said frozen carbon dioxide with its occluded particulate solids from said centrifugation means; and means for volatilizing the withdrawn frozen carbon dioxide so as to free it of said occluded particulate solids.

8. Apparatus according to claim 7, including means for creating an electrostatic field within the centrifugation means during centrifugation.

9. Apparatus according to claim 7, including means for vibrating at least part of the centrifugation means during centrifugation.

10. Apparatus according to claim 7, including means for moving solid matter within the centrifugation means thereof against centrifugal force.

11. Apparatus according to claim 10, wherein the means for moving solid matter within the centrifugation means is a screw conveyor providing discharge for frozen carbon dioxide.

12. Apparatus according to claim 11, wherein the conveyor screw has an open flight section merging into a substantially closed flight section leading to discharge for the frozen carbon dioxide.

13. Apparatus according to claim 11, including annular deflector means at the feed end of the screw conveyor, said deflector having a truncated cone shape and being adapted to deflect gaseous material introduced into the centrifugation means outwardly of the axis thereof.

14. Apparatus according to claim 7, wherein the means for liquefying the gaseous hydrochloric acid is decompression means.

15. Apparatus according to claim 7, wherein the means for liquefying the gaseous hydrochloric acid and freezing the gaseous carbon dioxide includes an expansion chamber within the centrifugation means and a feed pipe for the residual effluent gas stream extending axially into the centrifugation means and provided with many discharge holes leading into the said expansion chamber.

16. Apparatus according to claim 7, wherein the centrifugation means comprises an inner circumferential wall having apertures therethrough; an outer circumferential wall spaced apart from said inner wall; and means between said walls defining axial passageways for the flow of liquids to discharge.

17. Apparatus according to claim 16, wherein the apertures of the inner wall are tapered such that the openings at the inner surface of the inner wall are smaller than the openings at the outer surface of said inner wall.

18. Apparatus according to claim 16, wherein the passageway defining means between the inner wall and outer wall comprises corrugated plate means having axially oriented corrugations.

19. Apparatus according to claim 16, wherein discharge for liquids comprises a launder for receiving the liquids from the passageways.

20. A method of recovering carbon dioxide from an effluent gas stream containing gaseous carbon dioxide, comprising subjecting said gas stream to freezing so as to solidify said gaseous carbon dioxide; subjecting said stream containing the solidified carbon dioxide to centrifugation while mechanically positively moving the solidified carbon dioxide along the centrifuge during centrifugation to discharge therefrom against the resistance of centrifugal force, for separation of the said solidified carbon dioxide from said gas stream; and removing the solidified carbon dioxide from centrifugation separately from the remainder of the said stream.

21. A method according to claim 20, wherein the solidified carbon dioxide is moved to discharge by means of a feeder screw.

22. A method according to claim 21, wherein a controllable rotational velocity differential is maintained between the feed screw and the centrifuge.

23. A method according to claim 20, wherein the removed solidified carbon dioxide is heated in a rotating kiln to convert it to a gas for releasing any occluded particulate solids and to carry released occluded particulate solids to discharge.

24. A method of recovering carbon dioxide from an effluent gas stream containing gaseous carbon dioxide, comprising freezing said gaseous carbon dioxide to solidify it; subjecting said stream with the solidified carbon dioxide to centrifugation for separation of the frozen carbon dioxide therefrom; and removing the frozen carbon dioxide from centrifugation separately from the remainder of the said stream; and heating the frozen carbon dioxide to convert it to a gas and release any occluded particulate solids, the heating being carried out in a rotating kiln which carries occluded particulate solids to discharge.

25. Apparatus for recovering carbon dioxide from an effluent gas stream containing gaseous carbon dioxide, comprising centrifugation means; means for passing said gas stream into said centrifugation means; means for freezing the carbon dioxide in said gas stream; mechanical means for positively moving the frozen carbon dioxide to discharge from said centrifugation means and against the resistance of centrifugal force during centrifugation; and means for discharging the frozen carbon dioxide from said centrifugation means separately from the remainder of the said stream.

26. Apparatus according to claim 25, wherein the mechanical means for moving frozen carbon dioxide in the centrifugation means to discharge against the resistance caused by the centrifugal force acting thereon is a feed screw.

27. Apparatus according to claim 25, including means for maintaining a rotational velocity differential between the mechanical means and the centrifuge.

28. Apparatus according to claim 25, wherein means are provided for vibrating the walls of the centrifuge.

29. Apparatus according to claim 25, including a rotating kiln for heating the frozen carbon dioxide separated from the gas stream by the centrifugation means; and means for passing the separated frozen carbon dioxide from the discharge of said centrifugation means to said rotary kiln.

* * * * *

UNITED STATES PATENT AND TRADEMARK OFFICE
CERTIFICATE OF CORRECTION

PATENT NO. : 5,235,815

DATED : August 17, 1993

INVENTOR(S) : Jay P. Nielson

It is certified that error appears in the above-identified patent and that said Letters Patent is hereby corrected as shown below:

Column 9, line 53, Claim 5, "axially" should be deleted.

Signed and Sealed this

Twenty-seventh Day of September, 1994

Attest:

BRUCE LEHMAN

Attesting Officer     *Commissioner of Patents and Trademarks*